(12) United States Patent
Kaspa et al.

(10) Patent No.: US 12,463,814 B2
(45) Date of Patent: Nov. 4, 2025

(54) SYSTEMS AND METHODS FOR VALIDATING ADDED COMPONENTS OF A VEHICLE

(71) Applicant: Capital One Services, LLC, McLean, VA (US)

(72) Inventors: Chanakya Kaspa, McKinney, TX (US); Sikkandar Sikkandar Packiam, Mckinney, TX (US); Arunachalam Ramaswamy, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 203 days.

(21) Appl. No.: 18/494,868

(22) Filed: Oct. 26, 2023

(65) Prior Publication Data

US 2025/0141684 A1 May 1, 2025

(51) Int. Cl.
*H04L 9/32* (2006.01)
*G06F 21/44* (2013.01)
*G06N 20/00* (2019.01)

(52) U.S. Cl.
CPC ............ *H04L 9/3213* (2013.01); *G06F 21/44* (2013.01); *G06N 20/00* (2019.01)

(58) Field of Classification Search
CPC ......... H04L 9/3213; H04L 9/50; G06F 21/44; G06N 20/00
See application file for complete search history.

(56) References Cited

U.S. PATENT DOCUMENTS

| | | | |
|---|---|---|---|
| 10,688,920 B1 * | 6/2020 | Neubauer | B60Q 1/507 |
| 12,038,348 B1 * | 7/2024 | Okamoto | G06N 20/00 |
| 12,211,385 B2 * | 1/2025 | Puchalski | G08G 1/202 |
| 2021/0043312 A1 * | 2/2021 | Lindgren | G06Q 10/10 |
| 2021/0209494 A1 * | 7/2021 | Mukherjee | H04L 67/12 |

* cited by examiner

*Primary Examiner* — Javier O Guzman
(74) *Attorney, Agent, or Firm* — Foley & Lardner LLP

(57) ABSTRACT

Systems and methods for validating added components for a vehicle. In some aspects, the system may determine from a plurality of cryptographic tokens related to a plurality of assets, a cryptographic token corresponding to a validation request for an asset and received from a computing device. The system may determine whether one or more added components from the validation request are capable of being integrated with the asset in presence of one or more base components for the asset from the cryptographic token. In response to determining that the one or more added components are being integrated, the system may determine, using a first machine learning model, whether the one or more added components are credible. In response to determining that at least one component of the one or more added components is not credible, the system may generate an alert indicating the at least one component as not credible.

20 Claims, 5 Drawing Sheets

SYSTEMS AND METHODS FOR VALIDATING ADDED COMPONENTS OF A VEHICLE

SUMMARY

In recent years, the use of blockchain technology for various applications, including, but not limited to, smart contracts, non-fungible tokens, cryptocurrency, smart finance, blockchain-based data storage, etc. (referred to collectively herein as blockchain applications) has exponentially increased. Each of these applications benefits from blockchain technology that allows for the recording of information that is difficult or impossible to change (either in authorized or unauthorized manner). For example, a blockchain is essentially a digital ledger of transactions that is duplicated and distributed across the entire network of computer systems on the blockchain. The digital ledger of a blockchain is a decentralized source of information that does not require a central authority to monitor transactions, maintain records, and/or enforce rules. Instead, technology underlying the blockchain network, namely cryptography techniques (e.g., secret-key, public key, and/or hash functions), consensus mechanisms (e.g., Proof of Work ("POW"), Proof of Stake ("POS"), Delegated Proof of Stake ("dPOS"), Practical Byzantine Fault Tolerance ("pBFT"), Proof of Elapsed Time Broadly ("PoET"), etc.), and computer networks (e.g., peer-to-peer ("P2P"), the Internet, etc.) combine to provide a decentralized environment that enables the technical benefits of blockchain technology. By leveraging these technical benefits, decentralized information stored using a blockchain application can be used to validate vehicle components present in a vehicle. For example, the blockchain can provide a comprehensive and tamper-proof record for the entire lifecycle of a vehicle. Further, unique digital tokens can be used to record the manufacturing details of the vehicle to a blockchain. Aside from that, the blockchain can improve visibility of the automotive supply chain. For example, manufacturers, suppliers, and distributors can record their interactions on a shared blockchain, allowing real-time tracking of vehicle parts as they move through the supply line.

Methods and systems are described herein for novel uses and/or improvements to blockchain technology. As one example, methods and systems are described herein for validating added components for a vehicle using decentralized information stored using a blockchain application.

Existing systems sometimes allow unscrupulous entities to commit unauthorized discrepancies in modifications in user-chosen vehicles. For example, existing systems do not have a secure way to authenticate the modifications made to a vehicle. However, by leveraging decentralized information stored using a blockchain application, the described systems and methods accommodate cryptographic tokens and create tokens representative of key input to validate added components for a vehicle.

In some aspects, methods and systems disclosed herein access vehicle data, from a plurality of cryptographic tokens related to a plurality of vehicles. The vehicle data may include information related to added components for a corresponding vehicle and associated outcome for whether the added components were determined to be credible for the corresponding vehicle. The system may determine whether added components are compatible with base components for the vehicle from the cryptographic token, and in response to determining that the added components are compatible with the base components, determine, using a machine learning model, whether each added component of the list of added components is credible. For example, the system may utilize vehicle data to determine whether added components are compatible with the car. For instance, whether a car is able to have a moonroof based on the design constraints of the vehicle. Accordingly, the methods and systems can provide a reduction in discrepancies in modifications in user-chosen vehicles.

In some aspects, the system may determine from a plurality of cryptographic tokens related to a plurality of assets, a cryptographic token corresponding to a validation request for an asset and received from a computing device. The system may determine whether one or more added components from the validation request are capable of being integrated with the asset in presence of one or more base components for the asset from the cryptographic token. In response to determining that the one or more added components are capable of being integrated, the system may determine, using a first machine learning model, whether the one or more added components are credible. In response to determining that at least one component of the one or more added components is not credible, the system may generate an alert indicating the at least one component as not credible.

The system may receive a validation request. In particular, the system may receive, from a computing device, a validation request. The validation request may include a vehicle identifier and a list of added components. For example, the system may receive a validation request to determine whether a vehicle has the list of claimed modifications.

The system may access vehicle data. In particular, the system may access vehicle data, from a plurality of cryptographic tokens related to a plurality of vehicles. Each cryptographic token of the plurality of cryptographic tokens corresponds to a vehicle of the plurality of vehicles. The vehicle data comprises information related to added components for a corresponding vehicle and associated outcome for whether the added components were determined to be credible for the corresponding vehicle. An added component being credible may include the added component having a probability of being physically included in the corresponding vehicle that is above a threshold. For example, the system may access vehicle data that includes design constraints and safety regulations to determine an outcome for the validation request.

The system may train a machine learning model. For example, the system may train a first machine learning model based on the vehicle data to predict whether an added component for a corresponding vehicle is credible. For example, the system may train a machine learning model based on previous data about the vehicle make and model type.

The system may determine a cryptographic token. In particular, the system may determine, from the plurality of cryptographic tokens, a cryptographic token corresponding to the validation request based on the vehicle identifier. For example, the system may find and access a cryptographic token corresponding to the user-selected vehicle.

The system may determine whether the added components are compatible with the base components. In particular, the system may determine whether the list of added components from the validation request is compatible with base components for the vehicle from the cryptographic token. The base components comprise features with which the vehicle is manufactured. Added components may include features integrated with the vehicle in addition to the base components. An added component being compatible with a base component of the vehicle may include the added component being capable of being integrated with the vehicle in the presence of the base component. For example, the system may check whether a moonroof is compatible with the base components of the vehicle.

The system may determine whether an added component is credible. In particular, in response to determining that the list of added components is compatible with the base components, the system may determine, using the first machine learning model, whether each added component of the list of added components is credible. For example, the system may determine whether the moonroof is credible to be in the vehicle based on a machine learning model.

The system may generate an alert. In particular, in response to determining that one or more added components are not credible, the system may generate an alert indicating the one or more added components as not credible. For example, in response to determining the moonroof is not a feature of the vehicle, the system may generate an alert.

The system may transmit an alert. In particular, the system may transmit, to the computing device, the alert. For example, the system may send the alert to the user device. By doing so, the system is aware of the fraud.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
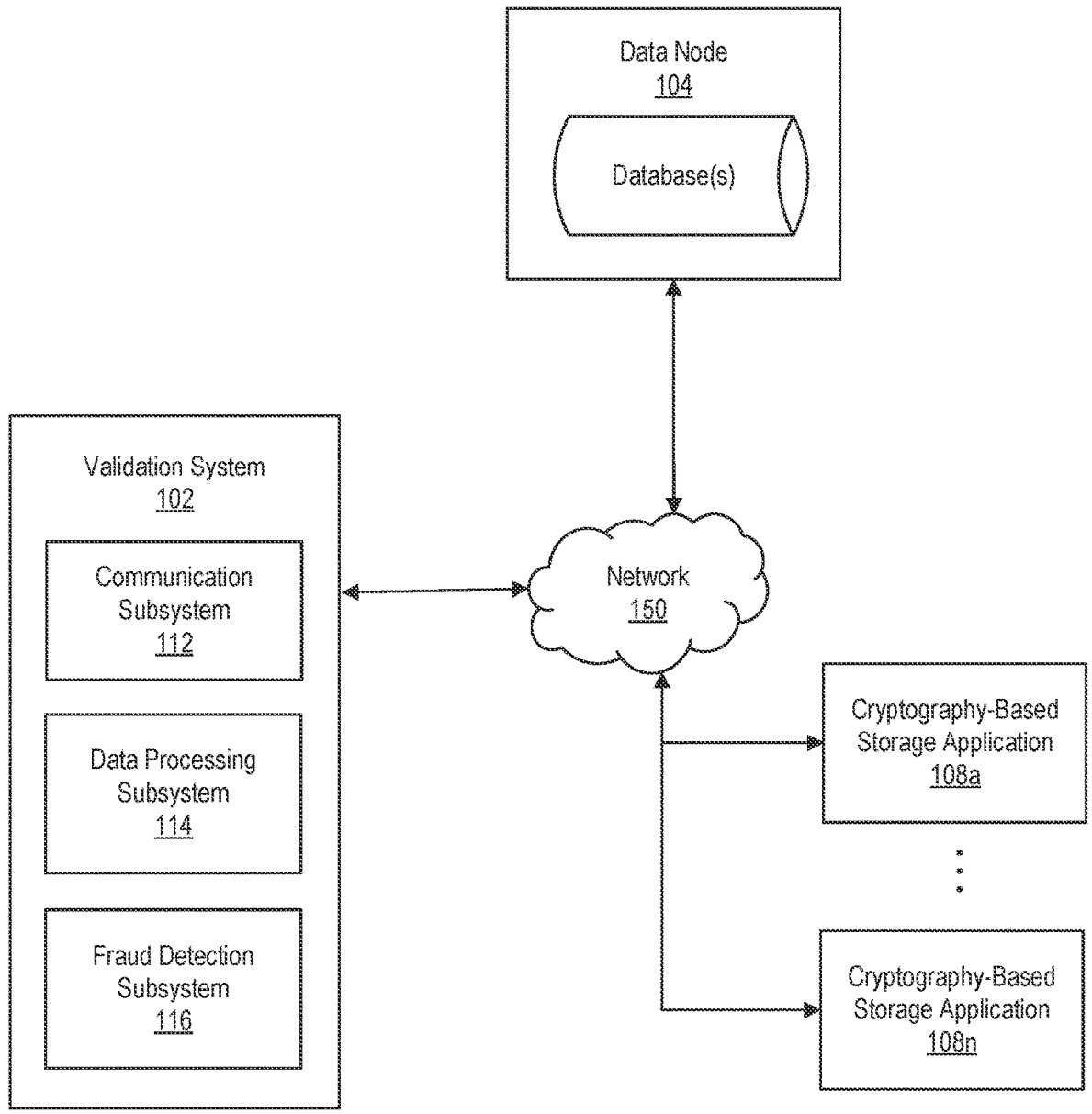
FIG. 1 shows an illustrative diagram for identifying powerbooking cases, in accordance with one or more embodiments.

FIG. 1 shows an illustrative diagram for identifying powerbooking cases, in accordance with one or more embodiments. Environment 100 includes validation system 102, data node 104, and cryptography-based storage application 108a-108n.

In disclosed embodiments, powerbooking may include a type of credit application fraud that car dealers commit. In some embodiments, the powerbooking may comprise a car dealer misrepresenting the equipment of the vehicle to the bank. For example, powerbooking may comprise a car dealer misleading the financing source about alleged added options to the vehicle. This impacts the price of the retail installment sale contract or lease contract for the vehicle.

Validation system 102 may include software, hardware, or a combination of both and may reside on a physical server or a virtual server running on a physical computer system. In some embodiments, validation system 102 may be configured on a user device (e.g., a laptop computer, a smartphone, a desktop computer, an electronic tablet, or another suitable user device). Furthermore, validation system 102 may reside on a cloud-based system and/or interface with computer models either directly or indirectly, for example, through network 150. Validation system 102 may include communication subsystem 112, data processing subsystem 114, and/or fraud detection subsystem 116.

Data node 104 may store various data, including one or more machine learning models, training data, user data profiles, input data, output data, performance data, and/or other suitable data. Data node 104 may include software, hardware, or a combination of the two. In some embodiments, validation system 102 and data node 104 may reside on the same hardware and/or the same virtual server or computing device. Network 150 may be a local area network, a wide area network (e.g., the Internet), or a combination of the two.

Cryptography-based storage applications 108a-108n may include software, hardware, or a combination of the two. For example, each cryptography-based storage application may include software executed on one or multiple devices or may include hardware such as a physical device. In some cases, the cryptography-based storage application may be software and may be stored in data nodes and a user of the cryptography-based storage application may access the cryptography-based storage application online, e.g., via a browser. Alternatively or additionally, the cryptography-based storage application may reside on a general-purpose computer or on a special device (e.g., a fob) intended for storing the cryptography-based storage application. For example, the device may store private keys in a memory of the device and allow transactions to be completed on the device itself. Examples of cryptography-based storage applications may include cryptographic wallets. Devices may include any suitable end-user computing devices (e.g., desktop computers, laptops, electronic tablets, smart phones, and/or other computing devices used by end users) capable of transmitting and receiving data such as requests and/or like transactions.

Validation system 102 may receive user responses from one or more client devices. Validation system 102 may receive data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104 or another computing device. Communication subsystem 112 may receive data, such as input data, or user responses. Communication subsystem 112 may communicate with data processing subsystem 114 and fraud detection subsystem 116.

Validation system 102 may include data processing subsystem 114. Communication subsystem 112 may pass at least a portion of the data or a pointer to the data in memory to data processing subsystem 114. Data processing subsystem 114 may include software components, hardware components, or a combination of both. For example, data processing subsystem 114 may include software components or may include one or more hardware components (e.g., processors) that are able to execute operations for processing vehicle data. Data processing subsystem 114 may access vehicle data. Data processing subsystem 114 may directly access data or nodes associated with cryptography-based storage application 108a-108n and may transmit data to these cryptography-based storage applications. Data processing subsystem 114 may, additionally or alternatively, receive data from and/or send data to communication subsystem 112 and fraud detection subsystem 116.

Validation system 102 may include fraud detection subsystem 116. Fraud detection subsystem 116 may execute tasks relating to training a machine learning model. Fraud detection subsystem 116 may include software components, hardware components, or a combination of both. For example, fraud detection subsystem 116 may train a machine learning model on vehicle data. Fraud detection subsystem 116 may access data, such as vehicle data and cryptographic tokens. Fraud detection subsystem 116 may directly access data or nodes associated with the cryptographic tokens. Fraud detection subsystem 116 may also receive input data, as well as data output by cryptography-based storage application 108a-108n. Fraud detection subsystem 116 may allow validation system 102 to improve model generation, in accordance with one or more embodiments. The fraud detection subsystem 116 may be used to identify cases of powerbooking. In disclosed embodiments, powerbooking may include a type of credit application fraud that car dealers commit. In some embodiments, the powerbooking may comprise a car dealer misrepresenting the equipment of the vehicle to the bank. For example, powerbooking may comprise a car dealer misleading the financing source about alleged added options to the vehicle. This impacts the price of the retail installment sale contract or lease contract for the vehicle. Fraud detection subsystem 116 may, additionally or alternatively, receive data from and/or send data to communication subsystem 112 or data processing subsystem 114.

Figure 2:
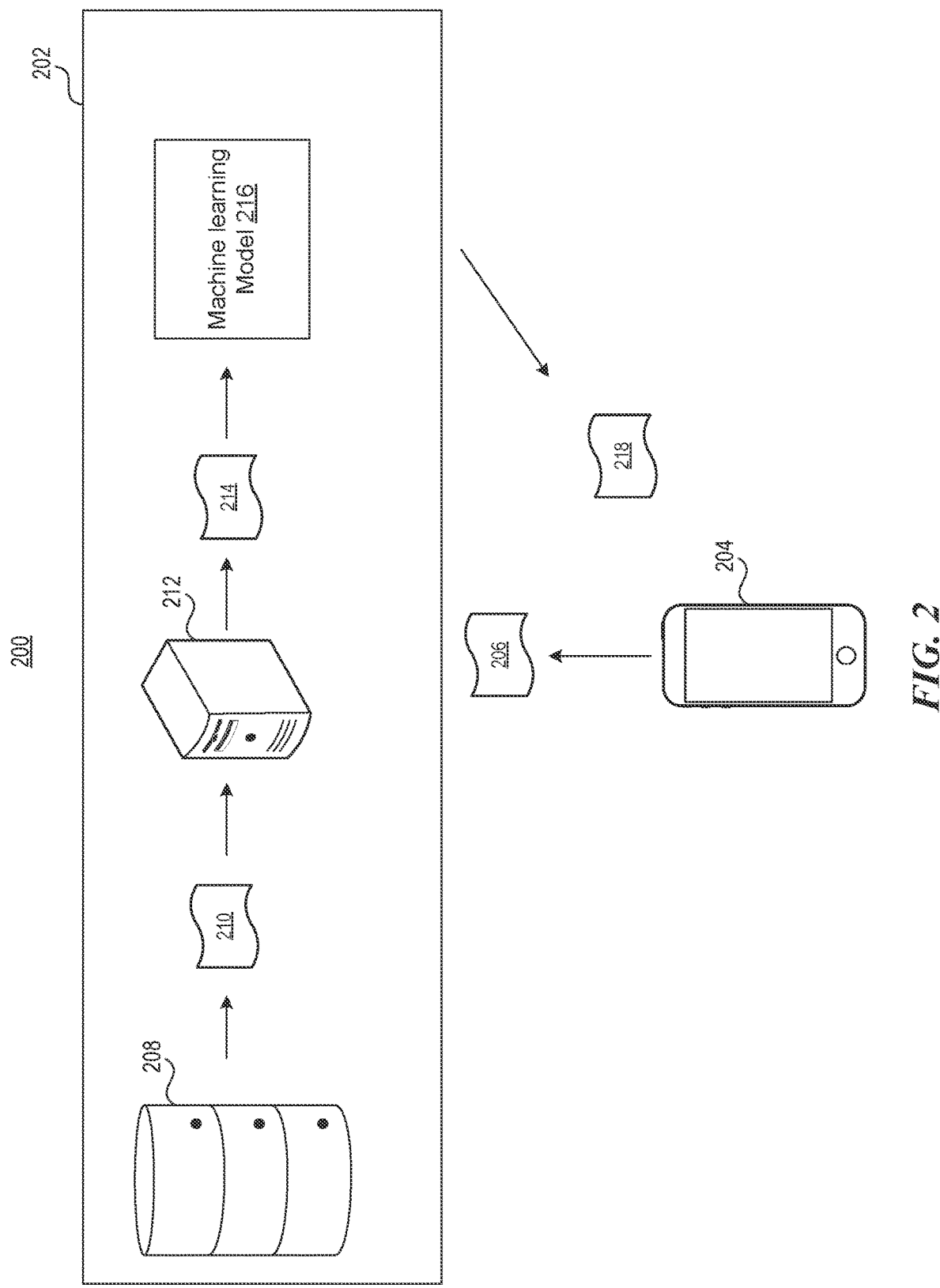
FIG. 2 shows an illustrative diagram for validating added components for a vehicle, in accordance with one or more embodiments.

FIG. 2 shows an illustrative diagram for validating added components for a vehicle, in accordance with one or more embodiments. FIG. 2 shows environment 200, server 202, user device 204, validation request 206, database 208, cryptographic token 210, processor 212, results 214, machine learning model 216, and alert 218. Server 202 may receive a validation request (e.g., validation request 206) via communication subsystem 112. In particular, server 202 may receive, from a computing device (e.g., user device 204), a validation request (e.g., validation request 206). The validation request (e.g., validation request 206). may include a vehicle identifier and a list of added components. For example, the system may receive a validation request to determine whether a vehicle has the list of claimed modifications. For instance, the system may receive validation request 206 from user device 204 to validate that a car the user is buying has a list of optional components that can be added onto the vehicle later. By doing so, a financial institution can determine an accurate worth for the vehicle based on accurate and reliable information.

In some embodiments prior to receiving the validation request, server 202 may generate a cryptographic token (e.g., token 210). In particular, server 202 may receive, from a user device (e.g., user device 204), a generation request to generate the cryptographic token (e.g., token 210). The generation request includes vehicle data and a user identifier. Server 202 may determine, based on the user identifier, an address associated with a cryptography-based storage application corresponding to the user device (e.g., user device 204). The cryptography-based storage application includes a private key. Server 202 may generate, using an on-chain program, the cryptographic token assigned to the address associated with the cryptography-based storage application. The cryptographic token includes a vehicle make, a vehicle model, and a vehicle year. For example, the system can generate a non-fungible token (e.g., token 210) when a vehicle is put on the market to be bought. By doing so, the system can keep track of the vehicle's entire history.

Server 202 may access vehicle data. In particular, server 202 may access vehicle data, from a plurality of cryptographic tokens related to a plurality of vehicles. Each cryptographic token of the plurality of cryptographic tokens corresponds to a vehicle of the plurality of vehicles. The vehicle data includes information related to added components for a corresponding vehicle and the associated outcome for whether the added components were determined to be credible for the corresponding vehicle. An added component being credible may include the added component having a probability of being physically included in the corresponding vehicle that is above a threshold. For example, the system may access vehicle data that includes design constraints and safety regulations to determine an outcome for the validation request. By doing so, the system may actively look for powerbooking instances by accessing vehicle data stored on non-fungible tokens in response to receiving validation request 206.

In some embodiments, server 202 may train a machine learning model (e.g., machine learning model 216). In particular, server 202 may train a first machine learning model based on the vehicle data to predict whether an added component for a corresponding vehicle is credible. For example, the system may train a machine learning model (e.g., machine learning model 216) based on previous data about the vehicle make and model type. By doing so, the system can analyze vehicle data using a machine learning model to determine how likely the corresponding vehicle is associated with powerbooking.

Server 202 may determine a cryptographic token (e.g., token 210). In particular, server 202 may determine, from the plurality of cryptographic tokens, a cryptographic token (e.g., token 210) corresponding to the validation request (e.g., validation request 206) based on the vehicle identifier. For example, the system may find and access a cryptographic token corresponding to the user-selected vehicle. For instance, the system may search through a database of non-fungible tokens for a specific non-fungible token that stores details about a vehicle a user plans to own. By doing so, the system is able to validate the components compatible to the vehicle.

Server 202 may determine whether the added components are compatible with the base components. In particular, server 202 may determine whether the list of added components from the validation request is compatible with base components for the vehicle from the cryptographic token. The base components may include features with which the vehicle is manufactured. Added components may include features integrated with the vehicle in addition to the base components. An added component being compatible with a base component of the vehicle may include the added component being capable of being integrated with the vehicle in the presence of the base component. For example, the system may check whether a moonroof is compatible with the base components of the vehicle. By doing so, the system may determine whether powerbooking or fraud is occurring. For instance, if a moonroof is not compatible with the base components, and the validation request 206 includes a moonroof apart of the list of added components, the system can determine that it is highly likely that powerbooking is occurring.

In some embodiments, server 202 may determine, using a second machine learning model, an added component as a customization or a modification. In particular, server 202 may determine whether the list of added components from the validation request is compatible with base components further includes determining, using a second machine learning model, an added component as a customization or a modification. The customization includes a change in the appearance of the vehicle. The modification includes a change in the functionality of the vehicle. In some embodiments, server 202 may in response to determining the added component as the customization, determine the added component is credible. For example, the system may recognize customizations are easy to add to a vehicle; therefore, the customization was credible. For instance, the vehicle may undergo a paint job. The system may determine the vehicle was accurately represented to the user in the new color and the user plans to own the vehicle with that customization. In some embodiments, server 202 may verify the cryptographic token for the added component by searching for a timestamp associated with the modification. For example, a previous user can modify the vehicle to include a moonroof. The non-fungible token (e.g., token 210) may record the modification with a timestamp. By doing so, the system is able to verify all modifications associated with the vehicle and determine that powerbooking is not occurring in this scenario.

Server 202 may determine whether an added component is credible. In particular, in response to determining that the list of added components is compatible with the base components, server 202 may determine, using the first machine learning model (e.g., machine learning model 216), whether each added component of the list of added components is credible. In some embodiments, the base components may include features with which the vehicle is manufactured and added components may include features integrated with the vehicle in addition to the base components. For example, the system may determine whether the moonroof is credible to be in the vehicle based on a machine learning model. In one embodiment, server 202 may retrieve the information relating to the vehicle from the cryptographic token, and server 202 may parse the information to generate a list of updated components related to the vehicle and the associated outcome. For example, the system (e.g., processor 212) may parse the information from the non-fungible token (e.g., token 210) to determine whether the vehicle has a compatible feature (e.g., trim level of the vehicle) that allows the vehicle to be modified. In response to determining the vehicle can be modified, inputting the data (e.g., results) from the token 210 into machine learning model 216. In some embodiments, the system may compare the plurality of cryptographic tokens to determine the probability of whether each added component of the list of added components is credible. For example, the system may analyze the information from the plurality of cryptographic tokens to determine the probability of each added component being credible depending on the rate of accuracy for each added component. For instance, the system can determine that 50% of all claimed moonroofs are a credible component of a vehicle the user is purchasing. Based on that rate, the system can utilize machine learning model 216 to determine whether in the current case, the user's vehicle includes a moonroof and based on that determination whether powerbooking is occurring.

In another embodiment, server 202 may determine whether the base components are credible based on the vehicle identifier. In particular, server 202 may in response to determining that the list of added components is not compatible with the base components, determine whether the base components are credible based on the vehicle identifier. For example, the system may determine that a moonroof is not compatible due to the structural design of the vehicle's roof such as a deep curve of the vehicle. The system may then verify whether the base components are accurate. For instance, the vehicle might not have the structural design of a deep curve roof and incorporating a moonroof is still a viable option. By doing so, the system may detect errors associated with the vehicle and its components. Therefore, the system may determine that powerbooking most likely is not taking place and there was an error in recording the vehicle and its components.

In some embodiments, server 202 may request a user to upload an image for the new added component. In particular, server 202 may search the plurality of cryptographic tokens and identify the added component as a new added component. Server 202 may request a user to upload a requested image for the new added component. Server 202 may determine, based on the requested image, whether the new added component is credible. In some embodiments, the system may request a user to upload a set of images. In particular, server 202 may in response to determining the list of added components from the validation request is compatible with base components, request a user to upload a set of images. Server 202 may receive the set of images from the user. The image in the set of images corresponds to the added component from the list of added components. Server 202 may determine whether the image in the set of images accurately captures the added components. For example, the system can have the user buying the vehicle take photos that verify the added components are present within the vehicle. By doing so, the system may verify whether the list of components from validation request 206 is accurate and determine whether powerbooking is occurring.

In some embodiments, the system may receive a first update, wherein the first update comprises a new added component to the vehicle. In particular, server 202 may receive a first update. The first update may include a new added component to the vehicle. Server 202 may update, using an on-chain program, the cryptographic token (e.g., token 210). The cryptographic token (e.g., token 210) may include new vehicle data. The new vehicle data may include the new added component. For example, when a user modifies the vehicle, the system may require the user to update the metadata of the non-fungible token to include the modifications.

In some embodiments, the system may request an appraisal. In particular, server 202 may in response to determining, using a first machine learning model, whether each added component of the list of added components is credible, request an appraisal. Server 202 may update, using an on-chain program, the cryptographic token (e.g., token 210). The cryptographic token (e.g., token 210) may include the appraisal. For example, after verifying the components of the vehicle, the user can request a price for the vehicle. The user can then update the metadata of the non-fungible token to include the appraisal of the vehicle. By doing so, the system is able to utilize the appraisal amount to determine whether to approve validation request 206. For example, based on the list of components associated with the vehicle from validation request 206, the system can generate a price for an auto loan. In the case of powerbooking, the loan may be larger than it should be. Therefore, the system can use the appraisal to determine whether the amount for the loan is valued correctly or whether it is too high due to powerbooking.

Server 202 may generate an alert (e.g., alert 218). In particular, in response to determining that one or more added components are not credible, server 202 may generate an alert indicating the one or more added components as not credible. For example, in response to determining the moonroof is not a feature of the vehicle, the system may generate an alert.

Server 202 may transmit an alert (e.g., alert 218). In particular, the system may transmit to the computing device (e.g., user device 204), the alert (e.g., alert 218). For example, the system may send alert 218 to the user device 204. By doing so, the system is enabling the user to be aware of the malicious activity (e.g., powerbooking) taking place.

In some embodiments, when a user is considering purchasing a vehicle, the user may decide to validate the vehicle and loan options before finalizing the purchase. Therefore, the user may send a validation request. After receiving the validation request (e.g., the purchase details such as the chosen vehicle and its details), the system can look through a database for a particular token (e.g., NFT) that stores and records details about the vehicle. After finding the particular token (e.g., NFT), the system can determine whether the loan options and pricing are accurate based on the vehicle components available for the car make and model. For example, the system may determine whether the list of added components from the validation request is compatible with base components for the vehicle stored in the cryptographic token. In response to determining that the list of added components is compatible with the base components, the system may determine, using the first machine learning model, whether each added component of the list of added components is credible. For instance, the system will check if the additional components available to be added to the vehicle are actually available to be added to the vehicle. Therefore, the loan options based on the vehicle components are accurate and the system can determine powerbooking is not occurring. In response to determining that one or more added components are not credible, the system may generate an alert indicating the one or more added components as not credible and transmit the alert to the user. Therefore, the user is aware that powerbooking is occurring and can reject the validation request and not purchase the vehicle from that particular car dealer.

Figure 3:
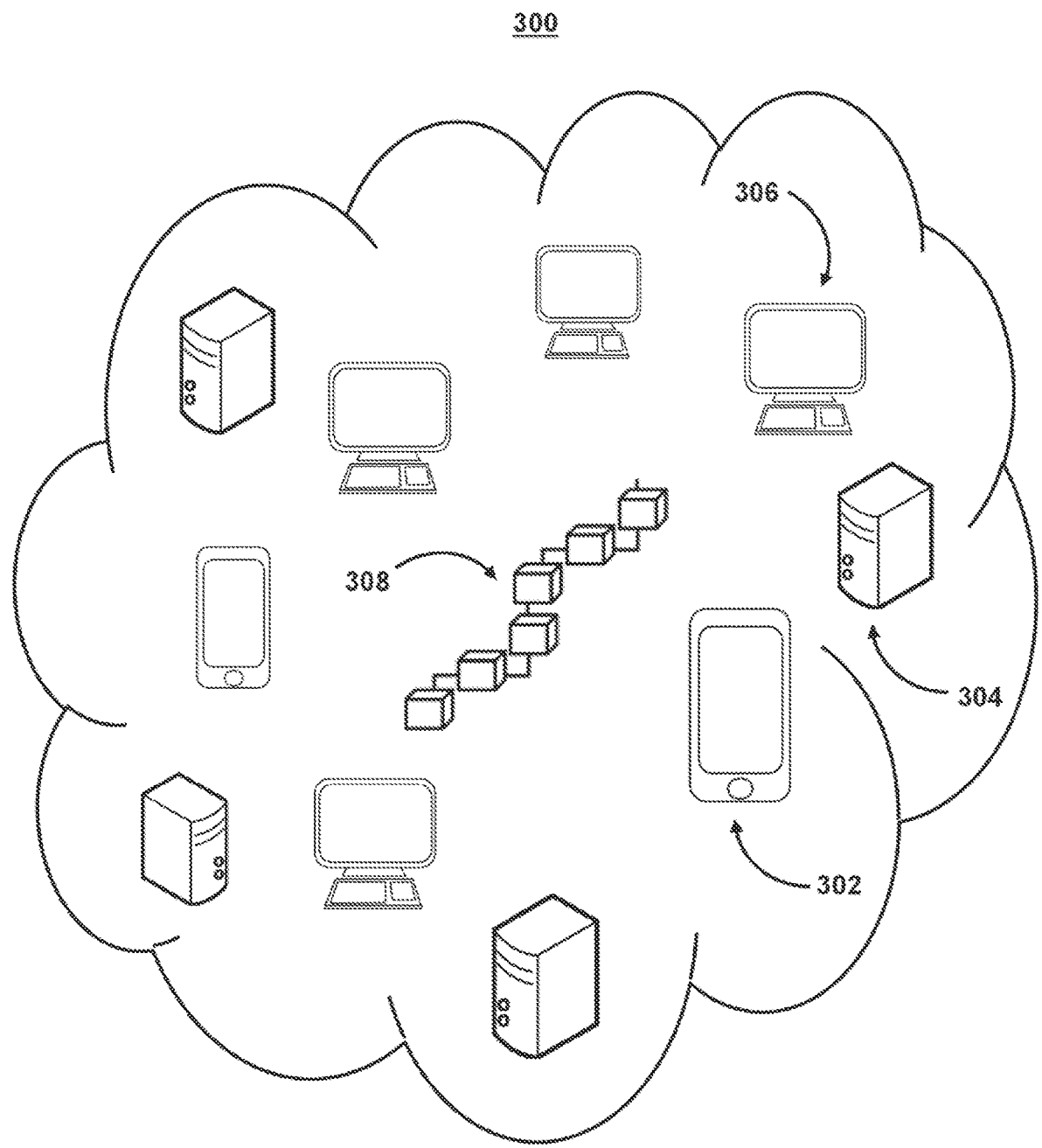
FIG. 3 shows illustrative components for a system used to validating added components for a vehicle in a decentralized environment for performing blockchain functions, in accordance with one or more embodiments.

FIG. 3 shows an illustrative diagram for a decentralized environment for performing blockchain functions, in accordance with one or more embodiments. For example, the diagram presents various components that may be used to validating added components for a vehicle in some embodiments.

As shown in FIG. 3, system 300 may include multiple user devices (e.g., user device 302, user device 302, and/or user device 306). For example, system 300 may comprise a distributed state machine, in which each of the components in FIG. 3 acts as a client of system 300. For example, system 300 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 300 may interact with, and facilitate the function of, blockchain 308.

It should be noted that, while shown as a smartphone, a personal computer, and a server in FIG. 3, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 300 performing a blockchain function may equally be applied to, and correspond to, an individual user device (e.g., user device 302, user device 304, and/or user device 306) performing the blockchain function. That is, system 300 may correspond to the user devices (e.g., user device 302, user device 304, and/or user device 306) collectively or individually.

Each of the user devices may be used by the system to conduct blockchain functions and/or contribute to validating added components for a vehicle. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 3, one or more user devices may include a digital wallet (e.g., user device 304) used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain functions, while a cold wallet is generally used for managing a user account and may have no connection to the internet.

As shown in FIG. 3, one or more user devices may include a private key and/or digital signature. For example, system 300 may use cryptographic systems for conducting blockchain functions such as validating added components for a vehicle. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain function) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain functions. As an illustration, when conducting blockchain functions, system 300 may use the digital signature to prove to every node in the system that it is authorized to conduct the blockchain functions.

For example, system 300 may comprise a plurality of nodes for the blockchain network. Each node may correspond to a user device (e.g., user device 302). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 302 may request a blockchain function (e.g., conduct a transaction). The blockchain function may be authenticated by user device 304 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain function, the blockchain function may be authorized. For example, after the blockchain function is authenticated between the users, system 300 may authorize the blockchain function prior to adding it to the blockchain. System 300 may add the blockchain function to blockchain 308. System 300 may perform this based on a consensus of the user devices within system 300. For example, system 300 may rely on a majority (or other metric) of the nodes in the community network (e.g., user device 302, user device 304, and/or user device 306) to determine that the blockchain function is valid. In response to validation of the block, a node user device (e.g., user device 302, user device 304, and/or user device 306) in the community network (e.g., a miner) may receive a reward (e.g., in a given cryptocurrency) as an incentive for validating the block.

To validate the blockchain function, system 300 may use one or more validation protocols and/or validation (or consensus) mechanisms. For example, system 300 may use a POW mechanism in which a user device must provide evidence that it performed computational work to validate a blockchain function and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 300 may use a POS mechanism in which a user account (e.g., corresponding to a node on the blockchain network) is required to have, or "stake," a predetermined amount of tokens in order for system 300 to recognize it as a validator in the blockchain network.

In response to validation of the block, the block is added to blockchain 308, and the blockchain function is completed. For example, to add the blockchain function to blockchain 308, the successful node (e.g., the successful miner) encapsulates the blockchain function in a new block before transmitting the block throughout system 300.

Figure 4:
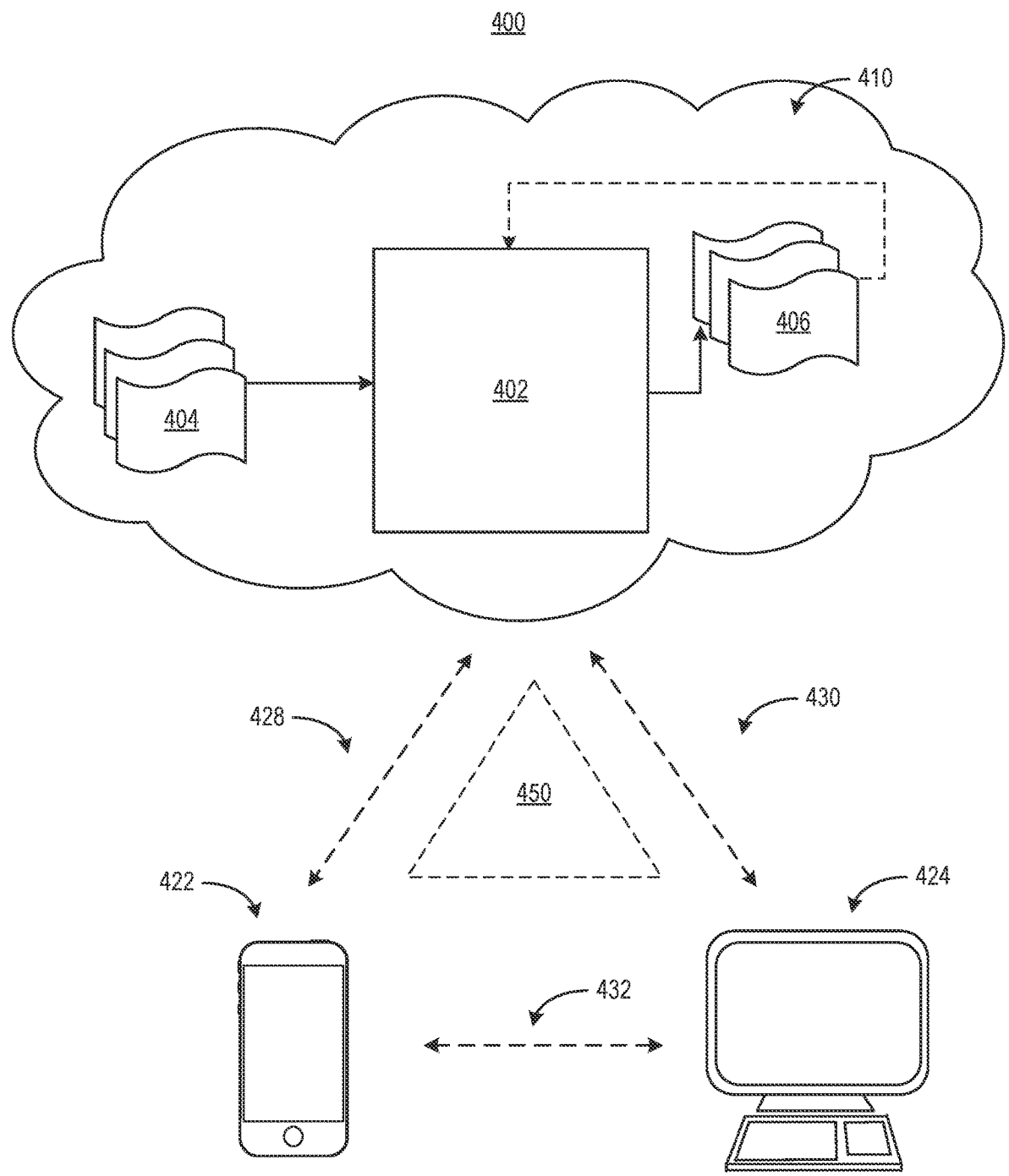
FIG. 4 shows illustrative components for a system used to validating added components for a vehicle using a machine learning model, in accordance with one or more embodiments.

FIG. 4 shows illustrative components for a system used to validating added components for a vehicle, in accordance with one or more embodiments. For example, FIG. 4 may show illustrative components for identifying powerbooking cases. As shown in FIG. 4, system 400 may include mobile device 422 and user terminal 424. While shown as a smartphone and personal computer, respectively, in FIG. 4, it should be noted that mobile device 422 and user terminal 424 may be any computing device, including, but not limited to, a laptop computer, a tablet computer, a hand-held computer, and other computer equipment (e.g., a server), including "smart," wireless, wearable, and/or mobile devices. FIG. 4 also includes cloud components 410. Cloud components 410 may alternatively be any computing device as described above, and may include any type of mobile terminal, fixed terminal, or other device. For example, cloud components 410 may be implemented as a cloud computing system, and may feature one or more component devices. It should also be noted that system 400 is not limited to three devices. Users may, for instance, utilize one or more devices to interact with one another, one or more servers, or other components of system 400. It should be noted, that, while one or more operations are described herein as being performed by particular components of system 400, these operations may, in some embodiments, be performed by other components of system 400. As an example, while one or more operations are described herein as being performed by components of mobile device 422, these operations may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., conversational response, queries, and/or notifications).

Additionally, as mobile device 422 and user terminal 424 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 410 may include validation system 102, communication subsystem 112, data processing subsystem 114, fraud detection subsystem 116, data node 104, or cryptography-based storage application 108a-108n, and may be connected to network 150. Cloud components 410 may access blockchain network (e.g., which in some embodiments may correspond to blockchain 308 (FIG. 2)). Additionally, cloud components 410 may access cryptography-based storage application 108a-108n.

Cloud components 410 may include model 402, which may be a machine learning model, artificial intelligence model, deep learning model, etc. (which may be referred collectively as "models" herein). Model 402 may take inputs 404 and provide outputs 406. The inputs may include multiple datasets, such as a training dataset and a test dataset. Each of the plurality of datasets (e.g., inputs 404) may include data subsets related to user data, predicted forecasts and/or errors, and/or actual forecasts and/or errors. In some embodiments, outputs 406 may be fed back to model 402 as input to train model 402 (e.g., alone or in conjunction with user indications of the accuracy of outputs 406, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., the likelihood a component is present within the vehicle).

In a variety of embodiments, model 402 may update its configurations (e.g., weights, biases, or other parameters) based on the assessment of its prediction (e.g., outputs 406) and reference feedback information (e.g., user indication of accuracy, reference labels, or other information). In a variety of embodiments, where model 402 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem solving, as compared to traditional computer programs. During training, an output layer of model 402 may correspond to a classification of model 402, and an input known to correspond to that classification may be input into an input layer of model 402 during training. During testing, an input without a known classification may be input into the input layer, and a determined classification may be output.

In some embodiments, model 402 may include multiple layers (e.g., where a signal path traverses from front layers to back layers). In some embodiments, back propagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402 (e.g., classifying a component as valid).

In some embodiments, the model (e.g., model 402) may automatically perform actions based on outputs 406. In some embodiments, the model (e.g., model 402) may not perform any actions. The output of the model (e.g., model 402) may be used to determine whether added components are credible for the vehicle.

System 400 also includes API layer 450. API layer 450 may allow the system to generate summaries across different devices. In some embodiments, API layer 450 may be implemented on mobile device 422 or user terminal 424. Alternatively or additionally, API layer 450 may reside on one or more of cloud components 410. API layer 450 (which may be A REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 450 may use various architectural arrangements. For example, system 300 may be partially based on API layer 450, such that there is strong adoption of SOAP and RESTful Web-services, using resources like Service Repository and Developer Portal, but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside. In this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use a developer portal. API layer 450 may use strong security constraints applying WAF and DDOS protection, and API layer 450 may use RESTful APIs as standard for external integration.

Figure 5:
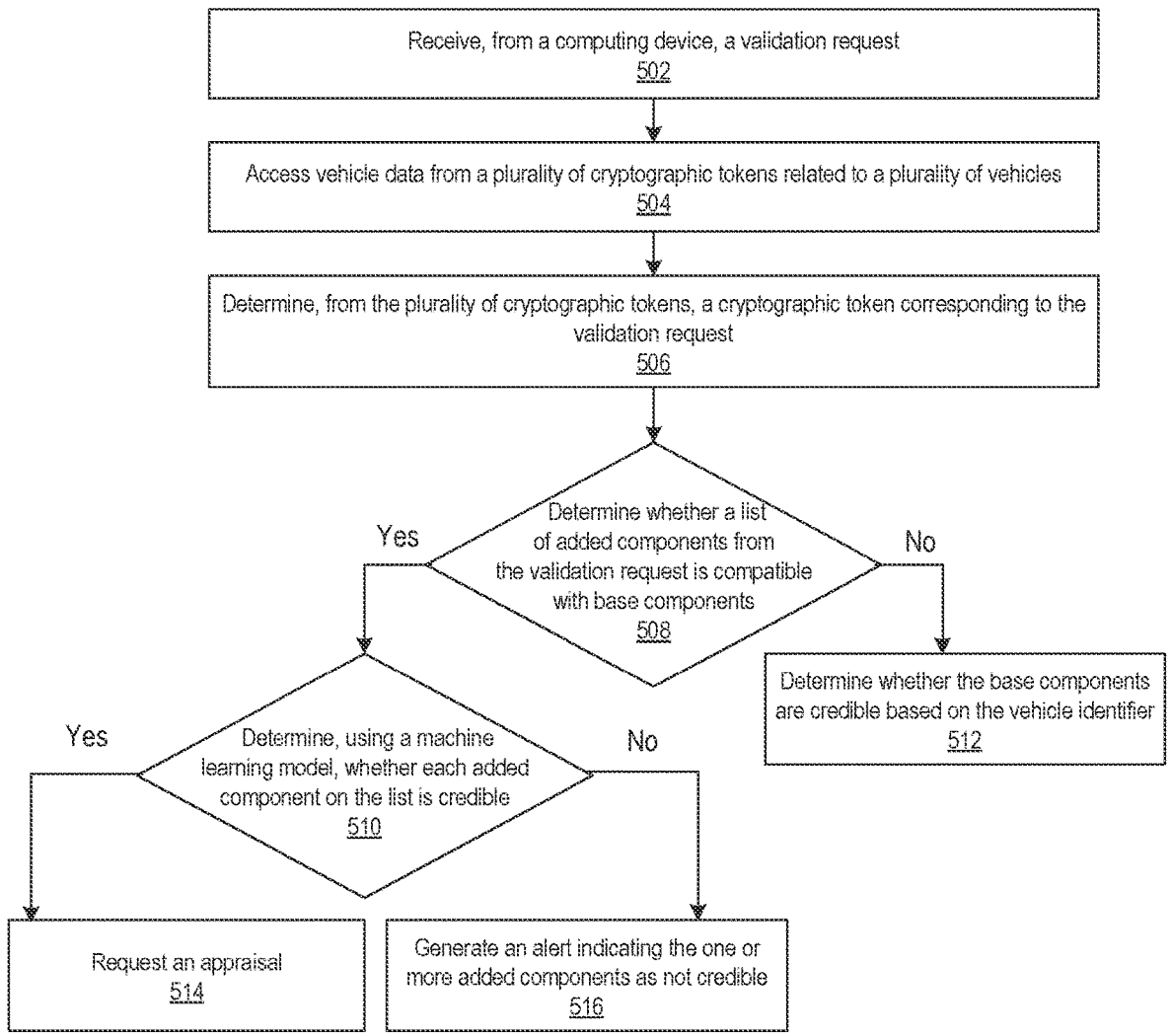
FIG. 5 shows a flowchart of the steps involved in validating added components for a vehicle, in accordance with one or more embodiments.

FIG. 5 shows a flowchart of the steps involved in validating added components for a vehicle, in accordance with one or more embodiments. For example, the system may use process 500 (e.g., as implemented on one or more system components described above) in order to identify cases of powerbooking.

At operation 502, process 500 (e.g., using one or more components described above) may receive, from a computing device, a validation request. For example, communication subsystem 112 may receive, from a computing device (e.g., user device 204), a validation request. The validation request may include a vehicle identifier and a list of added components. For example, the system may receive a validation request (e.g., validation request 206) to determine whether a vehicle has the list of claimed modifications.

At operation 504, process 500 (e.g., using one or more components described above may access vehicle data from a plurality of cryptographic tokens related to a plurality of vehicles. For example, communication subsystem 112 may access vehicle data, from a plurality of cryptographic tokens related to a plurality of vehicles. Each cryptographic token (e.g., token 210) of the plurality of cryptographic tokens corresponds to a vehicle of the plurality of vehicles. The vehicle data may include information related to added components for a corresponding vehicle and associated outcomes for whether the added components were determined to be credible for the corresponding vehicle. An added component being credible may include the added component having a probability of being physically included in the corresponding vehicle that is above a threshold. For example, communication subsystem 112 may access vehicle data that includes design constraints and safety regulations to determine an outcome for the validation request.

In some embodiments, the system may train a machine learning model. For example, the system may train a first machine learning model (e.g., machine learning model 216) based on the vehicle data to predict whether an added component for a corresponding vehicle is credible. For example, data processing subsystem 114 may train a machine learning model based on previous data about the vehicle make and model type.

At operation 506, process 500 (e.g., using one or more components described above) may determine, from the plurality of cryptographic tokens, a cryptographic token corresponding to the validation request (e.g., validation request 206). For example, data processing subsystem 114 may determine, from the plurality of cryptographic tokens, a cryptographic token corresponding to the validation request (e.g., validation request 206) based on the vehicle identifier. For example, data processing subsystem 114 may find and access a cryptographic token corresponding to the user-selected vehicle.

At operation 508, process 500 (e.g., using one or more components described above) may determine whether a list of added components from the validation request is compatible with the base components. For example, fraud detection subsystem 116 may determine whether the list of added components from the validation request (e.g., validation request 206) is compatible with base components for the vehicle from the cryptographic token (e.g., token 210). The base components may include features with which the vehicle is manufactured. Added components may include features integrated with the vehicle in addition to the base components. An added component being compatible with a base component of the vehicle may include the added component being capable of being integrated with the vehicle in the presence of the base component. For example, fraud detection subsystem 116 may check whether a moonroof is compatible with the base components of the vehicle.

In some embodiments, data processing subsystem 114 may determine, using a second machine learning model, an added component as a customization or a modification. In particular, data processing subsystem 114 may determine whether the list of added components from the validation request is compatible with base components further includes determining, using a second machine learning model, an added component as a customization or a modification. The customization includes a change in the appearance of the vehicle. The modification includes a change in the functionality of the vehicle. In some embodiments, data processing subsystem 114 may in response to determining the added component as the customization, determine the added component is credible. For example, data processing subsystem 114 may recognize customizations are easy to add to a vehicle; therefore, the customization was credible. For instance, the vehicle may undergo a paint job. The system may determine whether the vehicle was accurately represented to the user in the new color and the user plans to own the vehicle with that customization. In some embodiments, fraud detection subsystem 116 may verify the cryptographic token for the added component by searching for a timestamp associated with the modification. For example, a previous user can modify the vehicle to include a moonroof. The non-fungible token (e.g., token 210) may record the modification with a timestamp. By doing so, the system is able to verify all modifications associated with the vehicle.

At operation 510, process 500 (e.g., using one or more components described above) may determine, using a machine learning mode, whether each added component on the list is credible. For example, in response to determining that the list of added components is compatible with the base components, fraud detection subsystem 116 may determine, using the first machine learning model (e.g., machine learning model 216), whether each added component of the list of added components is credible. For example, the system may determine whether the moonroof is credible to be in the vehicle based on a machine learning model (e.g., machine learning model 216).

In some embodiments, the base components may include features with which the vehicle is manufactured and added components may include features integrated with the vehicle in addition to the base components. In one embodiment, communication subsystem 112 may retrieve the information relating to the vehicle from the cryptographic token (e.g., token 210), and data processing subsystem 114 may parse the information to generate a list of updated components related to the vehicle and the associated outcome. For example, data processing subsystem 114 may parse the information from the non-fungible token (e.g., token 210) to determine whether the vehicle has a compatible feature (e.g., trim level of the vehicle) that allows the vehicle to be modified. In response to determining the vehicle can be modified, inputting the data (e.g., results) from the token 210 into machine learning model 216.

In some embodiments, data processing subsystem 114 may compare the plurality of cryptographic tokens to determine the probability of whether each added component of the list of added components is credible. For example, fraud detection subsystem 116 may analyze the information from the plurality of cryptographic tokens to determine the probability of each added component being credible depending on the rate of accuracy for each added component. For instance, fraud detection subsystem 116 can determine that 50% of all claimed moonroofs are a credible component of a vehicle the user is purchasing. Based on that rate, fraud detection subsystem 116 can utilize machine learning model 216 to determine whether in the current case, the user's vehicle includes a moonroof.

At operation 512, process 500 (e.g., using one or more components described above) may determine whether the base components are credible based on the vehicle identifier. For example, data processing subsystem 114 may in response to determining that the list of added components is not compatible with the base components, determine whether the base components are credible based on the vehicle identifier. For example, data processing subsystem 114 may determine that a moonroof is not compatible due to the structural design of the vehicle's roof such as a deep curve of the vehicle. Fraud detection subsystem 116 may then verify that the base components are accurate. For instance, the vehicle might not have the structural design of a deep curve roof and incorporating a moonroof is still a viable option. By doing so, the system may detect errors associated with the vehicle and its components.

In some embodiments, communication subsystem 112 may request a user to upload an image for the new added component. For example, data processing subsystem 114 may search the plurality of cryptographic tokens and identify the added component as a new added component. Communication subsystem 112 may request a user to upload a requested image for the new added component. Fraud detection subsystem 116 may determine, based on the requested image, whether the new added component is credible. In some embodiments, communication subsystem 112 may request a user to upload a set of images. For example, communication subsystem 112 may in response to determining the list of added components from the validation request is compatible with base components, request a user to upload a set of images. Communication subsystem 112 may receive the set of images from the user. The image in the set of images corresponds to the added component from the list of added components. Fraud detection subsystem 116 may determine whether the image in the set of images accurately captures the added components. For example, the system can have the user buying the vehicle take photos that verify the added components are present within the vehicle.

At operation 514, process 500 (e.g., using one or more components described above) may request an appraisal. For example, communication subsystem 112 may in response to determining, using a first machine learning model, whether each added component of the list of added components is credible, request an appraisal. Data processing subsystem 114 may update, using an on-chain program, the cryptographic token (e.g., token 210). The cryptographic token (e.g., token 210) may include the appraisal. For example, after verifying the components of the vehicle, the user can request a price for the vehicle. The user can then update the metadata of the non-fungible token to include the appraisal of the vehicle.

At operation 516, process 500 (e.g., using one or more components described above) may generate an alert indicating the one or more added components as not credible. For example, in response to determining that one or more added components are not credible, data processing subsystem 114 may generate an alert indicating the one or more added components as not credible. For example, in response to determining the moonroof is not a feature of the vehicle, the system may generate an alert to user device 204. Communication subsystem 112 may transmit an alert. For example, communication subsystem 112 may transmit, to the computing device (e.g., user device 204), the alert (e.g., alert 218). By doing so, the system is enabling the user to be aware of the fraud.

In some embodiments, communication subsystem 112 may receive a first update, wherein the first update comprises a new added component to the vehicle. For example, communication subsystem 112 may receive a first update. The first update may include a new added component to the vehicle. Data processing subsystem 114 may update, using an on-chain program, the cryptographic token (e.g., token 210). The cryptographic token (e.g., token 210) may include new vehicle data. The new vehicle data may include the new added component. For example, when a user modifies the vehicle, the system may require the user to update the metadata of the non-fungible token to include the modifications.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, from a computing device, a validation request, wherein the validation request comprises a vehicle identifier and a list of added components; accessing vehicle data, from a plurality of cryptographic tokens related to a plurality of vehicles, wherein each cryptographic token of the plurality of cryptographic tokens corresponds to a vehicle of the plurality of vehicles, and wherein the vehicle data comprises information related to added components for a corresponding vehicle and associated outcome for whether the added components were determined to be credible for the corresponding vehicle, wherein an added component being credible comprises the added component having a probability of being physically included in the corresponding vehicle that is above a threshold; training a first machine learning model based on the vehicle data to predict whether an added component for a corresponding vehicle is credible; determining, from the plurality of cryptographic tokens, a cryptographic token corresponding to the validation request based on the vehicle identifier; determining whether the list of added components from the validation request is compatible with base components for the vehicle from the cryptographic token, wherein the base components comprise features with which the vehicle is manufactured, wherein added components comprise features integrated with the vehicle in addition to the base components, and wherein an added component being compatible with a base component of the vehicle comprises the added component being capable of being integrated with the vehicle in presence of the base component; in response to determining that the list of added components is compatible with the base components, determining, using the first machine learning model, whether each added component of the list of added components is credible; in response to determining that one or more added components are not credible, generating an alert indicating the one or more added components as not credible; and transmitting, to the computing device, the alert.

2. A method, the method comprising: receiving, from a computing device, a validation request, wherein the validation request comprises a vehicle identifier and a list of added components; accessing vehicle data, from a plurality of cryptographic tokens related to a plurality of vehicles, wherein the vehicle data comprises information related to added components for a corresponding vehicle and associated outcome for whether the added components were determined to be credible for the corresponding vehicle; determining, from the plurality of cryptographic tokens, a cryptographic token corresponding to the validation request based on the vehicle identifier; determining whether the list of added components from the validation request is compatible with base components for the vehicle from the cryptographic token, wherein an added component being compatible with a base component of the vehicle comprises the added component being capable of being integrated with the vehicle in presence of the base component; in response to determining that the list of added components is compatible with the base components, determining, using a first machine learning model, whether each added component of the list of added components is credible; and in response to determining that one or more added components are not credible, generating an alert indicating the one or more added components as not credible.

3. A method, the method comprising: determining, from a plurality of cryptographic tokens related to a plurality of assets, a cryptographic token corresponding to a validation request for an asset and received from a computing device; determining whether one or more added components from the validation request are capable of being integrated with the asset in presence of one or more base components for the asset from the cryptographic token; in response to determining that the one or more added components are capable of being integrated, determining, using a first machine learning model, whether the one or more added components are credible; and in response to determining that at least one component of the one or more added components is not credible, generating an alert indicating the at least one component as not credible.

4. The method of any one of the preceding embodiments, further comprising: prior to receiving the validation request, receiving, from a user device, a generation request to generate the cryptographic token, wherein the generation request comprises vehicle data and a user identifier; determining, based on the user identifier, an address associated with a cryptography-based storage application corresponding to the user device, wherein the cryptography-based storage application comprises a private key; and generating, using an on-chain program, the cryptographic token assigned to the address associated with the cryptography-based storage application, wherein the cryptographic token comprises a vehicle make, a vehicle model and a vehicle year.

5. The method of any one of the preceding embodiments, wherein determining, using a first machine learning model, whether each added component is credible, based on each associated outcome further comprises retrieving the information relating to the vehicle from the cryptographic token, and parsing the information to generate a list of updated components related to the vehicle and the associated outcome.

6. The method of any one of the preceding embodiments, further comprising, in response to determining that the list of added components is not compatible with the base components, determining whether the base components are credible based on the vehicle identifier.

7. The method of any one of the preceding embodiments, wherein determining, using a first machine learning model, whether each added component of the list of added components is credible, further comprises: transmitting, to a database, a first request for a plurality of cryptographic tokens, wherein the database stores a plurality of cryptographic tokens, and wherein the first request comprises a search vehicle identifier; and comparing the plurality of cryptographic tokens to determine probability of whether each added component of the list of added components is credible.

8. The method of any one of the preceding embodiments, further comprising: in response to determining the list of added components from the validation request is compatible with base components, requesting a user to upload a set of images; receiving the set of images from the user, wherein an image in the set of images corresponds to the added component from the list of added components; and determining whether the image in the set of images accurately captures the added components.

9. The method of any one of the preceding embodiments, wherein determining whether the list of added components from the validation request is compatible with base components further comprises determining, using a second machine learning model, an added component as a customization or a modification, wherein the customization comprises a change in an appearance in the vehicle, and wherein the modification comprises a change in functionality of the vehicle.

10. The method of any one of the preceding embodiments, further comprising, in response to determining the added component as the customization, determining the added component is credible.

11. The method of any one of the preceding embodiments, further comprising, in response to determining the added component as the modification, verifying the cryptographic token for the added component by searching for a timestamp associated with the modification.

12. The method of any one of the preceding embodiments, further comprising: receiving a first update, wherein the first update comprises a new added component to the vehicle; and updating, using an on-chain program, the cryptographic token, wherein the cryptographic token comprises new vehicle data, and wherein the new vehicle data comprises the new added component.

13. The method of any one of the preceding embodiments, further comprising: in response to determining, using a first machine learning model, whether each added component of the list of added components is credible, requesting an appraisal; and updating, using an on-chain program, the cryptographic token, wherein the cryptographic token comprises the appraisal.

14. The method of any one of the preceding embodiments, wherein determining, using a first machine learning model, whether each added component of the list of added components is credible further comprises: searching the plurality of cryptographic tokens and identifying the added component as a new added component; requesting a user to upload a requested image for the new added component; and determining, based on the requested image, whether the new added component is credible.

15. The method of any one of the preceding embodiments, wherein each cryptographic token of the plurality of cryptographic tokens corresponds to a vehicle of the plurality of vehicles.

16. The method of any one of the preceding embodiments, wherein an added component being credible comprises the added component having a probability of being physically included in the corresponding vehicle that is above a threshold.

17. The method of any one of the preceding embodiments, wherein the base components comprise features with which the vehicle is manufactured, and wherein added components comprise features integrated with the vehicle in addition to the base components.

18. The method of any one of the preceding embodiments, further comprises: training a first machine learning model based on the vehicle data to predict whether an added component for a corresponding vehicle is credible.

19. A tangible, non-transitory, computer-readable medium storing instructions that, when executed by a data processing apparatus, cause the data processing apparatus to perform operations comprising those of any of embodiments 1-18.

20. A system comprising one or more processors; and memory storing instructions that, when executed by the processors, cause the processors to effectuate operations comprising those of any of embodiments 1-18.

21. A system comprising means for performing any of embodiments 1-18.

What is claimed is:

1. A system for validating added components for a vehicle, the system comprising:
   one or more processors; and
   one or more non-transitory computer-readable media storing instructions that when executed by the one or more processors cause operations comprising:
      receiving, from a computing device, a validation request, wherein the validation request comprises a vehicle identifier and a list of added components;
      accessing vehicle data, from a plurality of cryptographic tokens related to a plurality of vehicles, wherein each cryptographic token of the plurality of cryptographic tokens corresponds to a vehicle of the plurality of vehicles, and wherein the vehicle data comprises information related to added components for a corresponding vehicle and associated outcome for whether the added components were determined to be credible for the corresponding vehicle, wherein an added component being credible comprises the added component having a probability of being physically included in the corresponding vehicle that is above a threshold;
      training a first machine learning model based on the vehicle data to predict whether an added component for a corresponding vehicle is credible;
      determining, from the plurality of cryptographic tokens, a cryptographic token corresponding to the validation request based on the vehicle identifier;
      determining whether the list of added components from the validation request is compatible with base components for the vehicle from the cryptographic token, wherein the base components comprise features with which the vehicle is manufactured, wherein added components comprise features integrated with the vehicle in addition to the base components, and wherein an added component being compatible with a base component of the vehicle comprises the added component being capable of being integrated with the vehicle in presence of the base component;
      in response to determining that the list of added components is compatible with the base components, determining, using the first machine learning model, whether each added component of the list of added components is credible;
      in response to determining that one or more added components are not credible, generating an alert indicating the one or more added components as not credible; and
      transmitting, to the computing device, the alert.

2. The system of claim 1, wherein the instructions when executed by the one or more processors cause further operations comprising:
   prior to receiving the validation request, receiving, from a user device, a generation request to generate the cryptographic token, wherein the generation request comprises vehicle data and a user identifier;
   determining, based on the user identifier, an address associated with a cryptography-based storage application corresponding to the user device, wherein the cryptography-based storage application comprises a private key; and
   generating, using an on-chain program, the cryptographic token assigned to the address associated with the cryptography-based storage application, wherein the cryptographic token comprises a vehicle make, a vehicle model and a vehicle year.

3. A method for validating added components for a vehicle, the method comprising:
   receiving, from a computing device, a validation request, wherein the validation request comprises a vehicle identifier and a list of added components;
   accessing vehicle data, from a plurality of cryptographic tokens related to a plurality of vehicles, wherein the vehicle data comprises information related to added components for a corresponding vehicle and associated outcome for whether the added components were determined to be credible for the corresponding vehicle;
   determining, from the plurality of cryptographic tokens, a cryptographic token corresponding to the validation request based on the vehicle identifier;
   determining whether the list of added components from the validation request is compatible with base components for the vehicle from the cryptographic token, wherein an added component being compatible with a base component of the vehicle comprises the added component being capable of being integrated with the vehicle in presence of the base component;
   in response to determining that the list of added components is compatible with the base components, determining, using a first machine learning model, whether each added component of the list of added components is credible; and
   in response to determining that one or more added components are not credible, generating an alert indicating the one or more added components as not credible.

4. The method of claim 3, wherein determining, using a first machine learning model, whether each added component is credible, based on each associated outcome further comprises retrieving the information relating to the vehicle from the cryptographic token, and parsing the information to generate a list of updated components related to the vehicle and the associated outcome.

5. The method of claim 3, further comprising, in response to determining that the list of added components is not compatible with the base components, determining whether the base components are credible based on the vehicle identifier.

6. The method of claim 3, wherein determining, using a first machine learning model, whether each added component of the list of added components is credible, further comprises:
   transmitting, to a database, a first request for a plurality of cryptographic tokens, wherein the database stores a plurality of cryptographic tokens, and wherein the first request comprises a search vehicle identifier; and
   comparing the plurality of cryptographic tokens to determine probability of whether each added component of the list of added components is credible.

7. The method of claim 3, further comprising:
   in response to determining the list of added components from the validation request is compatible with base components, requesting a user to upload a set of images;

receiving the set of images from the user, wherein an image in the set of images corresponds to the added component from the list of added components; and
determining whether the image in the set of images accurately captures the added components.

8. The method of claim 3, wherein determining whether the list of added components from the validation request is compatible with base components further comprises determining, using a second machine learning model, an added component as a customization or a modification, wherein the customization comprises a change in an appearance in the vehicle, and wherein the modification comprises a change in functionality of the vehicle.

9. The method of claim 8, further comprising, in response to determining the added component as the customization, determining the added component is credible.

10. The method of claim 8, further comprising, in response to determining the added component as the modification, verifying the cryptographic token for the added component by searching for a timestamp associated with the modification.

11. The method of claim 3, further comprising:
receiving a first update, wherein the first update comprises a new added component to the vehicle; and
updating, using an on-chain program, the cryptographic token, wherein the cryptographic token comprises new vehicle data, and wherein the new vehicle data comprises the new added component.

12. The method of claim 3, further comprising:
in response to determining, using a first machine learning model, whether each added component of the list of added components is credible, requesting an appraisal; and
updating, using an on-chain program, the cryptographic token, wherein the cryptographic token comprises the appraisal.

13. The method of claim 3, wherein determining, using a first machine learning model, whether each added component of the list of added components is credible further comprises:
searching the plurality of cryptographic tokens and identifying the added component as a new added component;
requesting a user to upload a requested image for the new added component; and
determining, based on the requested image, whether the new added component is credible.

14. The method of claim 3, wherein each cryptographic token of the plurality of cryptographic tokens corresponds to a vehicle of the plurality of vehicles.

15. The method of claim 3, wherein an added component being credible comprises the added component having a probability of being physically included in the corresponding vehicle that is above a threshold.

16. The method of claim 3, wherein the base components comprise features with which the vehicle is manufactured, and wherein added components comprise features integrated with the vehicle in addition to the base components.

17. The method of claim 3, further comprising:
training a first machine learning model based on the vehicle data to predict whether an added component for a corresponding vehicle is credible.

18. One or more non-transitory computer-readable media storing instructions that when executed by one or more processors cause operations comprising:
determining, from a plurality of cryptographic tokens related to a plurality of assets, a cryptographic token corresponding to a validation request for an asset and received from a computing device;
determining whether one or more added components from the validation request are capable of being integrated with the asset in presence of one or more base components for the asset from the cryptographic token;
in response to determining that the one or more added components are capable of being integrated, determining, using a first machine learning model, whether the one or more added components are credible; and
in response to determining that at least one component of the one or more added components is not credible, generating an alert indicating the at least one component as not credible.

19. The one or more non-transitory computer-readable media of claim 18, wherein the instructions when executed by the one or more processors cause further operations comprising:
accessing asset data, from the plurality of cryptographic tokens, wherein the asset data comprises information related to added components for a corresponding asset and associated outcome for whether the added components were determined to be credible for the corresponding asset, wherein an added component being credible comprises the added component having a probability of being integrated in the corresponding asset that is above a threshold; and
training the first machine learning model based on the asset data to predict whether an added component for a corresponding asset is credible.

20. The one or more non-transitory computer-readable media of claim 18, wherein the instructions when executed by the one or more processors cause further operations comprising:
prior to receiving the validation request, receiving, from a user device, a generation request to generate the cryptographic token, wherein the generation request comprises asset data and a user identifier;
determining, based on the user identifier, an address associated with a cryptography-based storage application corresponding to the user device, wherein the cryptography-based storage application comprises a private key; and
generating, using an on-chain program, the cryptographic token assigned to the address associated with the cryptography-based storage application.

* * * * *